Jan. 25, 1944.   M. ZÜHLKE   2,340,098
CONTACT RECTIFIER
Filed Dec. 9, 1941
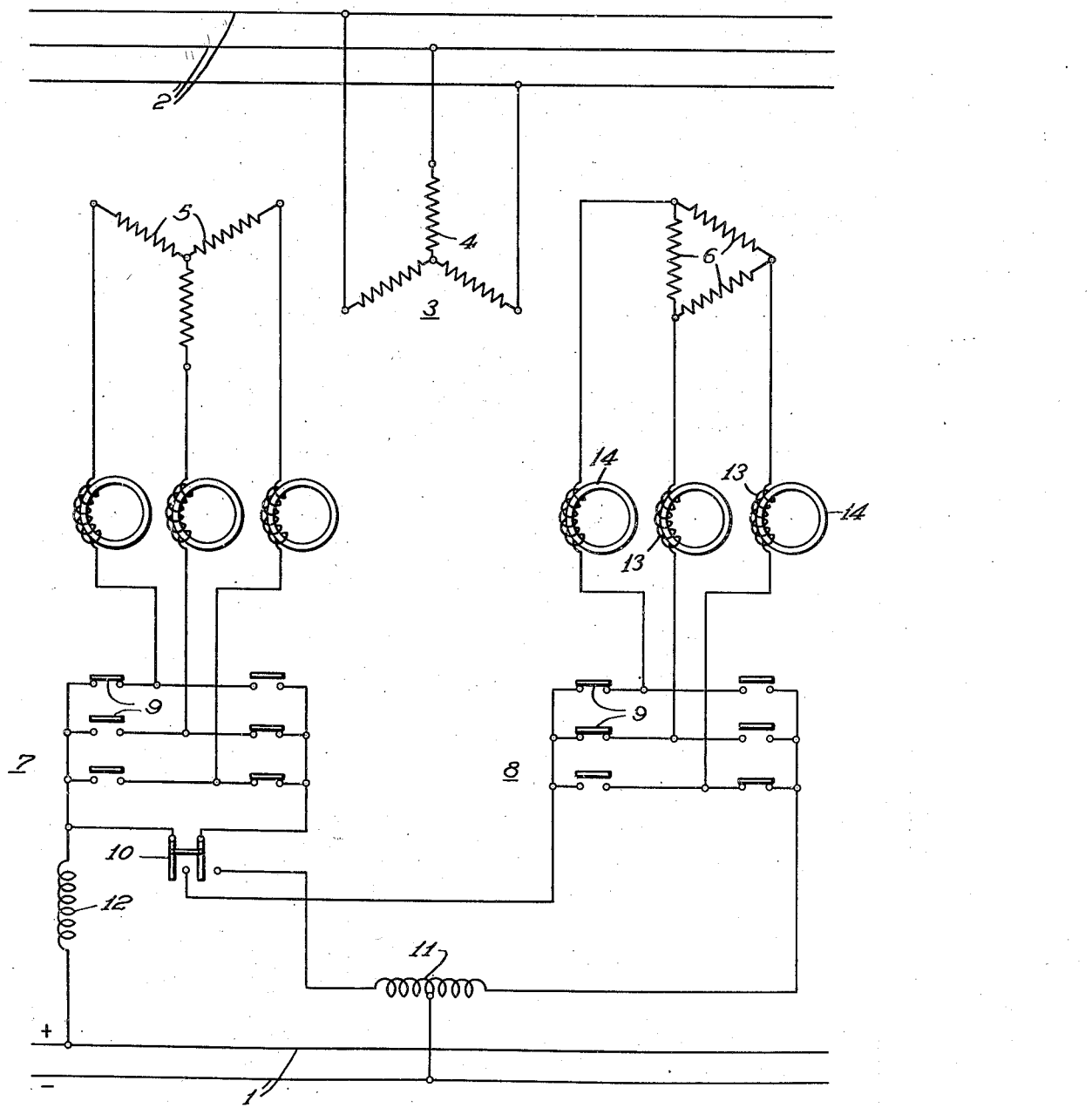
WITNESSES:
Edward Michaels
Wm. C. Groome
INVENTOR
Marcell Zühlke.
BY
S. A. Stricklett
ATTORNEY Patented Jan. 25, 1944

2,340,098

UNITED STATES PATENT OFFICE 2,340,098

CONTACT RECTIFIER

Marcell Zühlke, Berlin, Germany, assignor to Westinghouse Electric & Manufacturing Company, East Pittsburgh, Pa., a corporation of Pennsylvania Application December 9, 1941, Serial No. 422,189 In Germany November 28, 1939

2 Claims. (Cl. 175—364)

This invention relates to an electrical conversion system and particularly to a conversion system utilizing mechanical contactor elements for producing a plurality of direct-current voltages.

In the operation of conversion systems for producing direct-current voltages it is often desirable to provide a system capable of producing a plurality of distinctly separate potentials. This is particularly desirable in the electro-chemical field, where various cell operations require different operating voltages. According to the invention, a plurality of substantially independent mechanical contact rectifiers are utilized to produce independent rectified potential and switching means are utilized to connect these potentials either in parallel or in series to the direct-current circuit.

It is accordingly an object of the invention to provide a conversion system capable of operating at a plurality of direct-current voltages.

It is a further object of the invention to provide a rectifier system having a plurality of independent potentials which may be connected either in series or in parallel to the direct-current circuit.

It is a further object of the invention to provide means for operating rectifier systems either in parallel or in series.

Other objects and advantages of the invention will be apparent from the following detailed description taken in conjunction with the accompanying drawing in which the figure is a schematic illustration of a conversion system according to the invention.

According to the exemplary embodiment of the invention, a direct-current circuit 1 is supplied with energy from an alternating-current circuit 2 by means of a transformer 3 having a primary winding 4 connected to the alternating-current circuit 2 and a plurality of substantially independent secondary windings 5 and 6, each of which supplies energy to substantially independent groups of rectifying devices 7 and 8, herein illustrated as mechanical-type contact rectifiers having a plurality of contact elements 9 for providing a full wave bridge type rectifier for each group of rectifier devices.

Preferably, the secondary windings 5 and 6 are of different types and are disposed in phase relation so that the resultant direct-current voltage will have a minimum ripple because of the rectifier action. For example, I have shown one of the secondary windings 5 as being connected in star and the other 6 as connected in polygon.

A suitable control switch 10 is provided for connecting the rectifier groups 7 and 8 to the direct-current circuit 1. The control switch 10 is preferably of the simple type and can be operated to connect the rectifier groups 7 and 8 either in series or in parallel.

To further improve the ripple effect in the direct-current circuit 1, I have provided an inter-phase transformer 11 for interlocking the operation of the converters 7 and 8 when they are operating in parallel. I also utilize a portion of the inter-phase transformer 11 as a series choke when the switching device 10 is arranged to connect the converter groups 7 and 8 in series. If desired, a further smoothing reactor 12 may be connected in series with one or both of the converter groups.

In the three alternating-current leads of each bridge type rectifier are connected three switching reactors 13 that facilitate the commutation of the current handled by the contact-making devices 9. The cores 14 of the switching reactors 13 should preferably be provided in the form of a flat coil obtained by coiling up a ribbon of a ferromagnetic material that is magnetically of very high quality; more specifically: the ferromagnetic material to be used for this purpose should have a magnetizing characteristic whose inclination with respect to the axis of ordinates along which the intensity of the flux is measured should be as small as possible within the non-saturated region, the knee of the characteristic—which marks the transition from the non-saturated to the saturated region—should be as sharp as possible, and the portion of the characteristic comprised within the saturated region should be as closely as possible parallel to the axis of abscissae along which the intensity of the magnetomotive force is measured. The number of turns and the cross-sectional area of the core 14 of said switching reactors 13 should be preferably so chosen that the core 14 will be unsaturated only when the instantaneous value of the current is very small, that is, for current-values in the vicinity of the point of zero current. Instead of providing three switching reactors 13 for each group of contact-making devices 9, it is equally well possible to provide six switching reactors for each group, in which case a reactor 13 is inserted between the operating current terminal of every contact-making device 9 and the branch-point of the corresponding phase-wire that leads to one of the transformer terminals. And furthermore, it is feasible to equip the switching reactors 13 with auxiliary windings for producing a superposed magnetization, which, when energized by means of a controllable direct or alternating current, provide a means of magnetically controlling the cores 14 of the switching reactors 13 (the controlling effect being obtained by appropriately adjusting the intensity of the energizing current flowing in these superposed-magnetization windings), for the purpose of adapting the converter outfit to various loading conditions, or for the purpose of controlling the direct current voltage. In so far as these switching reactors are concerned, the proposed method of obtaining from the converter outfit a plurality of voltages having different magnitudes, by rearranging the connections between the various independent groups of contact-making devices that constitute said outfit, offers the advantage that the active voltage for every one of the switching reactors will always have the same magnitude, so that the duration of the intervals of almost vanishing current during which the current-commutation is greatly facilitated (intervals produced by the switching reactors, by virtue of the periodic de-saturation of their cores) will always remain constant.

In the operation of the conversion system, according to the invention, the full wave rectifier groups 7 and 8 each operate to produce their individual potenials, which are preferably of the same order of magnitude. These potentials are applied to a direct-current circuit 1 by means of the switching device 10 which may be shifted to connect both of the positive terminals in parallel to the direct-current circuit 1, while negative terminals are connected to the direct-current circuit 1 through the interphase transformer 11. If an operation requiring a higher potential is being performed, the switching device 10 may be shifted to connect the direct-current potentials of the converter groups 7 and 8 in series across the direct-current circuit 1. In this case, the interphase transformer 11 will only be utilized as a smoothing reactor in series with one of the groups 8 of rectifier devices.

While for purposes of illustration I have shown mechanical contact rectifiers which are particularly suitable for low voltage operation such as certain electro-chemical operations, it will be readily apparent that the mechanical contact devices 9 may be replaced with well-known electric valve devices for higher voltage operation where the voltage drop in the valves does not materially influence the efficiency of the device.

While I have shown and described specific embodiments of the invention, it will be apparent that changes and modifications can be made therein without departing from the true spirit of the invention or the scope of the appended claims.

What is claimed is:

1. An electric conversion system comprising an alternating current supply circuit, a variable voltage direct-current load circuit, a transformer including a primary winding and a plurality of substantially independent secondary windings, one of said secondary windings being star connected and another of said secondary windings being polygon connected, a full wave rectifier for each of said secondary windings and switching means for connecting said rectifier to said direct-current circuit either in series or in parallel.

2. An electric conversion system comprising an alternating current supply circuit, a variable voltage direct-current load circuit, a transformer including a primary winding and a plurality of substantially independent secondary windings, one of said secondary windings being star connected and another of said secondary windings being polygon connected, a mechanical contactor rectifier for each of said secondary windings, switching means for selectively connecting said rectifiers to the direct-current circuit either in parallel or in series for controlling the potential of the direct-current circuit.

MARCELL ZÜHLKE.